(12) United States Patent
Avudaiyappan et al.

(10) Patent No.: US 10,884,739 B2
(45) Date of Patent: *Jan. 5, 2021

(54) SYSTEMS AND METHODS FOR LOAD CANCELING IN A PROCESSOR THAT IS CONNECTED TO AN EXTERNAL INTERCONNECT FABRIC

(71) Applicant: Intel Corporation, Santa Clara, CA (US)

(72) Inventors: Karthikeyan Avudaiyappan, Sunnyvale, CA (US); Mohammad Abdallah, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,105

(22) Filed: May 24, 2018

(65) Prior Publication Data

US 2018/0267801 A1    Sep. 20, 2018

Related U.S. Application Data

(63) Continuation of application No. 15/244,873, filed on Aug. 23, 2016, now Pat. No. 10,013,254, which is a
(Continued)

(51) Int. Cl.
*G06F 12/00* (2006.01)
*G06F 9/30* (2018.01)
(Continued)

(52) U.S. Cl.
CPC ........ *G06F 9/30043* (2013.01); *G06F 9/3842* (2013.01); *G06F 9/3861* (2013.01);
(Continued)

(58) Field of Classification Search
CPC .................... G06F 12/0862; G06F 12/0215
See application file for complete search history.

(56) References Cited

U.S. PATENT DOCUMENTS 5,835,949 A * 11/1998 Quattromani ......... G06F 9/3812
711/135
6,453,389 B1    9/2002 Weinberger et al.
(Continued)

OTHER PUBLICATIONS

Advisory Action from U.S. Appl. No. 15/244,873, dated Jan. 30, 2018, 3 pages.
(Continued)

*Primary Examiner* — Prasith Thammavong
(74) *Attorney, Agent, or Firm* — NDWE, LLP

(57) ABSTRACT

Systems and methods for load canceling in a processor that is connected to an external interconnect fabric are disclosed. As a part of a method for load canceling in a processor that is connected to an external bus, and responsive to a flush request and a corresponding cancellation of pending speculative loads from a load queue, a type of one or more of the pending speculative loads that are positioned in the instruction pipeline external to the processor, is converted from load to prefetch. Data corresponding to one or more of the pending speculative loads that are positioned in the instruction pipeline external to the processor is accessed and returned to cache as prefetch data. The prefetch data is retired in a cache location of the processor.

7 Claims, 7 Drawing Sheets

Related U.S. Application Data continuation of application No. 13/649,505, filed on Oct. 11, 2012, now Pat. No. 9,424,046.

(51) Int. Cl.
| | |
|---|---|
| *G06F 12/02* | (2006.01) |
| *G06F 12/0862* | (2016.01) |
| *G06F 9/38* | (2018.01) |
| *G06F 12/0875* | (2016.01) |

(52) U.S. Cl.
CPC ...... *G06F 12/0215* (2013.01); *G06F 12/0862* (2013.01); *G06F 12/0875* (2013.01); *G06F 2212/452* (2013.01)

(56) References Cited

U.S. PATENT DOCUMENTS

| | | | |
|---|---|---|---|
| 6,535,962 | B1 | 3/2003 | Mayfield et al. |
| 6,564,313 | B1 | 5/2003 | Kashyap |
| 6,636,945 | B2 | 10/2003 | Nakamura |
| 6,915,415 | B2 | 7/2005 | Mayfield et al. |
| 7,509,484 | B1 | 3/2009 | Golla et al. |
| 7,533,242 | B1 | 5/2009 | Moll et al. |
| 7,707,359 | B2 | 4/2010 | Mesard et al. |
| 8,145,805 | B2 * | 3/2012 | Miller ................. G06F 9/3855 710/39 |
| 8,549,255 | B2 | 10/2013 | Schroter et al. |
| 9,098,418 | B2 | 8/2015 | Kannan et al. |
| 2003/0131218 | A1 | 7/2003 | Mayfield et al. |
| 2003/0233521 | A1 | 12/2003 | Pudipeddi et al. |
| 2005/0154834 | A1 * | 7/2005 | Steely, Jr. ........... G06F 12/0831 711/133 |
| 2005/0154835 | A1 * | 7/2005 | Steely, Jr. ........... G06F 12/0862 711/133 |
| 2005/0154865 | A1 * | 7/2005 | Steely, Jr. ............... G06F 9/383 712/228 |
| 2006/0265572 | A1 | 11/2006 | Stempel et al. |
| 2007/0150660 | A1 | 6/2007 | Marathe et al. |
| 2007/0294482 | A1 | 12/2007 | Kadambi et al. |
| 2008/0163010 | A1 * | 7/2008 | Racunas ............. G06F 11/0721 714/699 |
| 2010/0169611 | A1 * | 7/2010 | Chou .................... G06F 9/3844 712/205 |
| 2011/0040906 | A1 | 2/2011 | Chung et al. |
| 2011/0145502 | A1 | 6/2011 | Joshi et al. |
| 2011/0219208 | A1 | 9/2011 | Asaad et al. |
| 2013/0262779 | A1 | 10/2013 | Bobba et al. |
| 2014/0089589 | A1 | 3/2014 | Meier et al. |
| 2014/0089592 | A1 * | 3/2014 | Biswas ............... G06F 12/0862 711/133 |
| 2014/0208039 | A1 | 7/2014 | Gilbert et al. |

OTHER PUBLICATIONS

Final Office Action from U.S. Appl. No. 13/649,505, dated Aug. 26, 2015, 22 pages.
Final Office Action from U.S. Appl. No. 15/244,873, dated Nov. 16, 2017, 21 pages.
Non-Final Office Action from U.S. Appl. No. 13/649,505, dated Feb. 11, 2015, 16 pages.
Non-Final Office Action from U.S. Appl. No. 13/649,505, dated Feb. 12, 2016, 15 pages.
Non-Final office action from U.S. Appl. No. 15/244,873, dated May 5, 2017, 17 pages.
Notice of Allowance from U.S. Appl. No. 13/649,505, dated Jul. 26, 2016, 4 pages.
Notice of Allowance from U.S. Appl. No. 13/649,505, dated Jun. 6, 2016, 15 pages.
Notice of Allowance from U.S. Appl. No. 15/244,873, dated Mar. 8, 2018, 7 pages.

* cited by examiner

SYSTEMS AND METHODS FOR LOAD CANCELING IN A PROCESSOR THAT IS CONNECTED TO AN EXTERNAL INTERCONNECT FABRIC

CROSS-REFERENCE TO RELATED APPLICATIONS

This application is a continuation of U.S. application Ser. No. 15/244,873, filed Aug. 23, 2016 (now U.S. Pat. No. 10,013,254, issued Jul. 3, 2018), which is a continuation of U.S. application Ser. No. 13/649,505, filed Oct. 11, 2012 (now U.S. Pat. No. 9,424,046, issued Aug. 23, 2016), which are hereby incorporated by reference.

BACKGROUND

A central processing unit (CPU) or processor is the hardware within a computer system which executes the instructions of a computer program by performing the basic arithmetic, logical and input and output operations of the computer system. Cache memory components of a processor are data storage structures that are used by the processor to reduce the average time that it takes to access memory. It is cache that stores copies of data that are located in the most frequently used main memory locations. Cache memory is memory that is smaller in storage capacity than main memory but is memory that can be accessed much more quickly.

Some processors with cache memory support load speculation. Processors that support load speculation employ load speculation to reduce processor-memory exchanging bottlenecks or latency by putting data into cache in advance of executing an actual load instruction that corresponds to the data. Load speculation involves predicting the loads that need to be prospectively executed. As a part of this process, mispredictions can occur. Mispredictions are predictions that incorrectly identify the loads that need to be prospectively executed. These loads are called speculative bad loads. Mispredictions can result in the initiation of the execution of such loads.

When it is determined that a misprediction or some other action that results in the occupation of the load queue by speculative bad loads has occurred, a flush of the load queue is necessary to free the load queue for incoming loads. The flushing of the speculative bad loads from the load queue results in their cancellation. When a load queue flush is signaled, speculative bad loads can be executing at stages of the instruction pipeline that are both internal and external to the processor. Accordingly, a flush of the load queue can involve speculative bad loads executing in the instruction pipeline at stages both internal and external to the processor.

In a computer system, a device interconnect structure is generally utilized that connects a processor to other devices or processors. The interconnect structure is called a bus or interconnect fabric. In some conventional systems the interconnect fabric does not enable loads that are executing at places therein to be cancelled. As such, a flush of the load queue that involves speculative bad loads executing at places in the interconnect fabric can be prevented until the speculative bad loads are returned to the load queue. Accordingly, new loads, which must be placed into the load queue before being executed, can be prevented from accessing the cache system of a processor for several cycles until the speculative bad loads are returned from the interconnect fabric to the load queue for cancellation purposes. As such, some conventional approaches feature an inefficient instruction pipeline flush handling scheme that results in unsatisfactory delays in the execution of important load queue flushes.

SUMMARY

Conventional approaches to load canceling in processors that are connected to an external bus feature an inefficient instruction pipeline flush handling scheme that results in unsatisfactory delays in load queue flushes. A method for load canceling in a processor that is connected to an external bus is disclosed that addresses these shortcomings. However, the claimed embodiments are not limited to implementations that address any or all of the aforementioned shortcomings. As a part of the method, responsive to a flush request and a corresponding cancellation of pending speculative loads from a load queue, a type of one or more of the pending speculative loads that are executing in the instruction pipeline external to the processor, is converted from load to prefetch. Subsequently, data corresponding to the one or more pending speculative loads that are positioned in the instruction pipeline external to the processor is accessed and returned to cache as prefetch data. The prefetch data is retired in a location of the cache system. In this manner, the ingress of fresh loads into the frontend of the processor's cache system is enabled (by freeing the load queue) while the need to wait for data corresponding to speculative bad loads to be returned to the load queue from the interconnect fabric such that they can be canceled is obviated.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
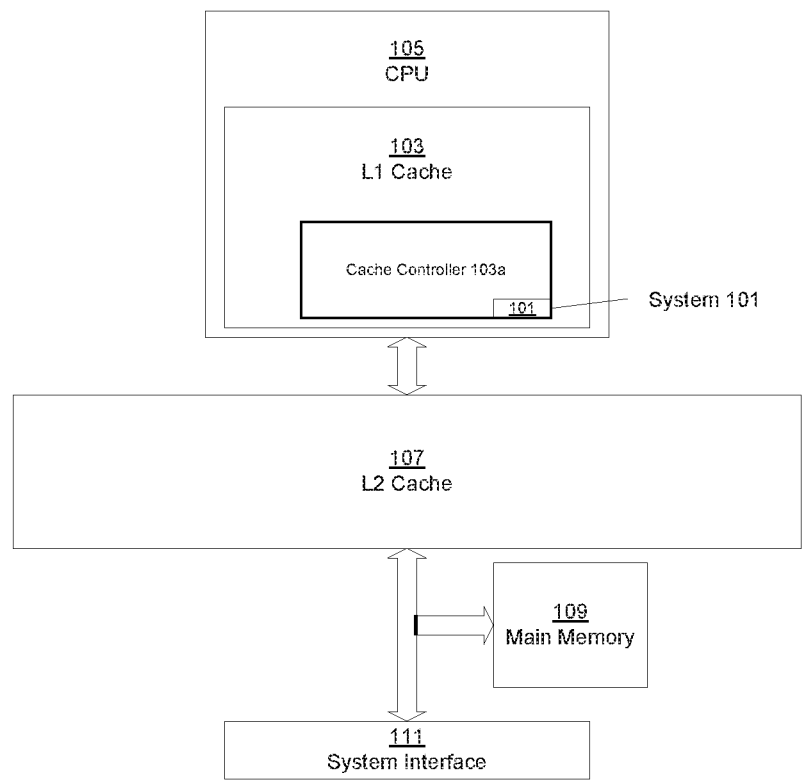
FIG. 1A shows an exemplary operating environment of a system for load canceling in a processor that is connected to an external bus according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "converting" or "accessing" or "retiring" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Exemplary Operating Environment of a System for Load Canceling in a Processor that is Connected to an External Interconnect Fabric According to One Embodiment FIG. 1A shows an exemplary operating environment 100 of a system 101 for load canceling in a processor that is connected to an external interconnect fabric according to one embodiment. System 101, in response to a flush of pending speculative loads from a load queue, converts corresponding speculative load operations executing at stages of the instruction pipeline external to the processor, from loads to prefetches and terminates corresponding speculative load operations executing at stages of the instruction pipeline internal to the processor. Data returned from points external to the processor that correspond to the prefetches are retired in the cache. In this manner, system 101 enables the ingress of fresh/new loads into the frontend of the processor (by freeing the load queue) while obviating the need to wait for data corresponding to speculative bad loads to be returned from the interconnect fabric. FIG. 1A shows system 101, L1 cache 103, L1 cache controller 103a, CPU 105, L2 cache 107, main memory 109 and system interface 111. In one embodiment, CPU 105, L1 cache 103 and L2 cache 107 are components of a processor that is coupled to an external bus.

Referring to FIG. 1A, L1 cache 103 is a level 1 cache and L2 cache 107 is a level 2 cache. In one embodiment, L1 cache 103 maintains entries that are accessed by requests for data that are associated with addresses located in L1 cache 103. In one embodiment, responsive to a flush request and a corresponding cancellation of pending speculative loads from a load queue, pending speculative loads that are executing in L1 cache 103 and L2 cache 107 (as well as other places internal to the processor) are dropped. However, in one embodiment, pending speculative loads that are located beyond L2 cache 107, outside of the processor, in the interconnect fabric (such as, but not limited to an Advanced eXtensible Interface (AXI) bus interface) at the point in time in which the flush request is signaled, are converted to prefetches. In one embodiment, L2 cache 107 tracks loads that are sent from it into the interconnect fabric and receives the corresponding data that is returned to it from the interconnect fabric. This data is retired in the caches.

Figure 1B:
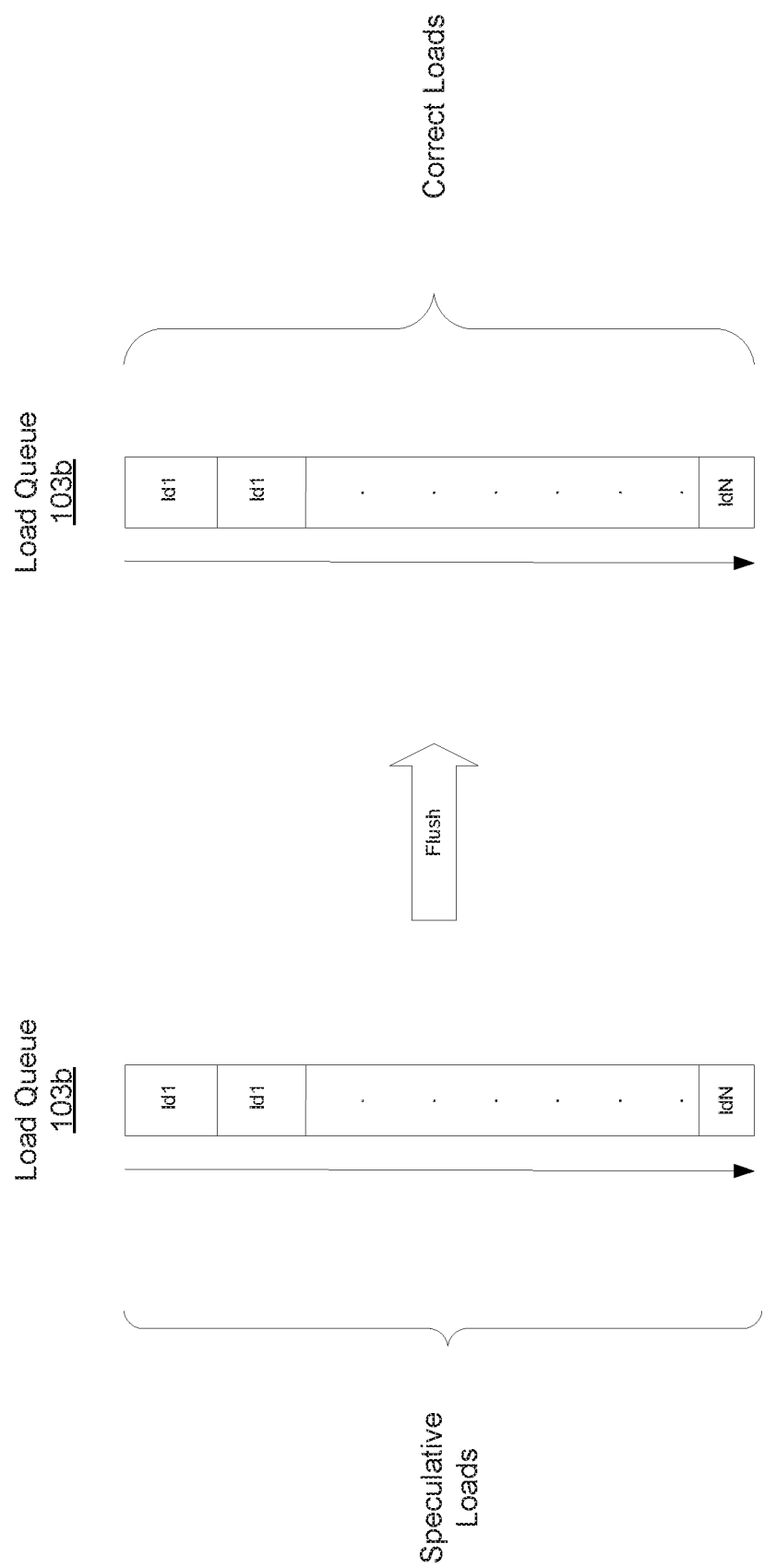
FIG. 1B illustrates the flushing of a load queue by the cancellation of its pending speculative loads, and the filling of the load queue with loads that are associated with an instruction branch that has been determined to be correct according to one embodiment.

System 101, responsive to a flush request that causes the cancellation of pending speculative loads from a load queue, converts pending speculative load operations that are executing in the instruction pipeline at stages external to caches 103 and 107 (e.g., outside of the processor) from loads to prefetches, and terminates or "drops" pending speculative load operations executing in the instruction pipeline at stages internal to caches 103 and 107 (e.g., inside of the processor). In one embodiment, system 101 can reside in cache controller 103a. In other embodiments, system 101 can be separate from cache controller 103a but operate cooperatively therewith. Referring to FIG. 1B, the flushing of load queue 103b by the cancellation of its pending speculative loads, and the filling of load queue 103b with loads that have been determined to be "good" (e.g., are associated with the correct instruction branch), is shown. In one embodiment, at this time, as discussed above, the speculative load operations that are executing in pipeline locations internal to the processor are terminated (e.g., dropped). However, the speculative load operations that are executing in pipeline locations external to the processor (outside of the processor within the interconnect fabric) are converted to prefetches. Thereafter, when data that corresponds to the speculative loads is returned to the processor, the data is treated as prefetch data and placed into cache 103 without being loaded into a register.

Referring again to FIG. 1A, main memory 109 includes physical addresses that store the information that is copied into cache memory when it is requested from main memory 109. In one embodiment, load misses in L1 cache 103 and L2 cache 107 can result in an access of main memory 109 for the data that is sought. In one embodiment, speculative loads that access entries in main memory 109 and elsewhere in the interconnect fabric are converted to prefetches when pending speculative loads are cancelled (such as when the correct loads are determined). In one embodiment, when data that is contained in physical addresses of main memory 109 is accessed based on a speculative load that has been flushed from load queue 103b and is returned to the L1 cache 103, the data is treated as prefetch data and placed into L1 cache 103 without being loaded into a processor register location. Also, shown in FIG. 1A is system interface 111.

Operation

Figure 1C:
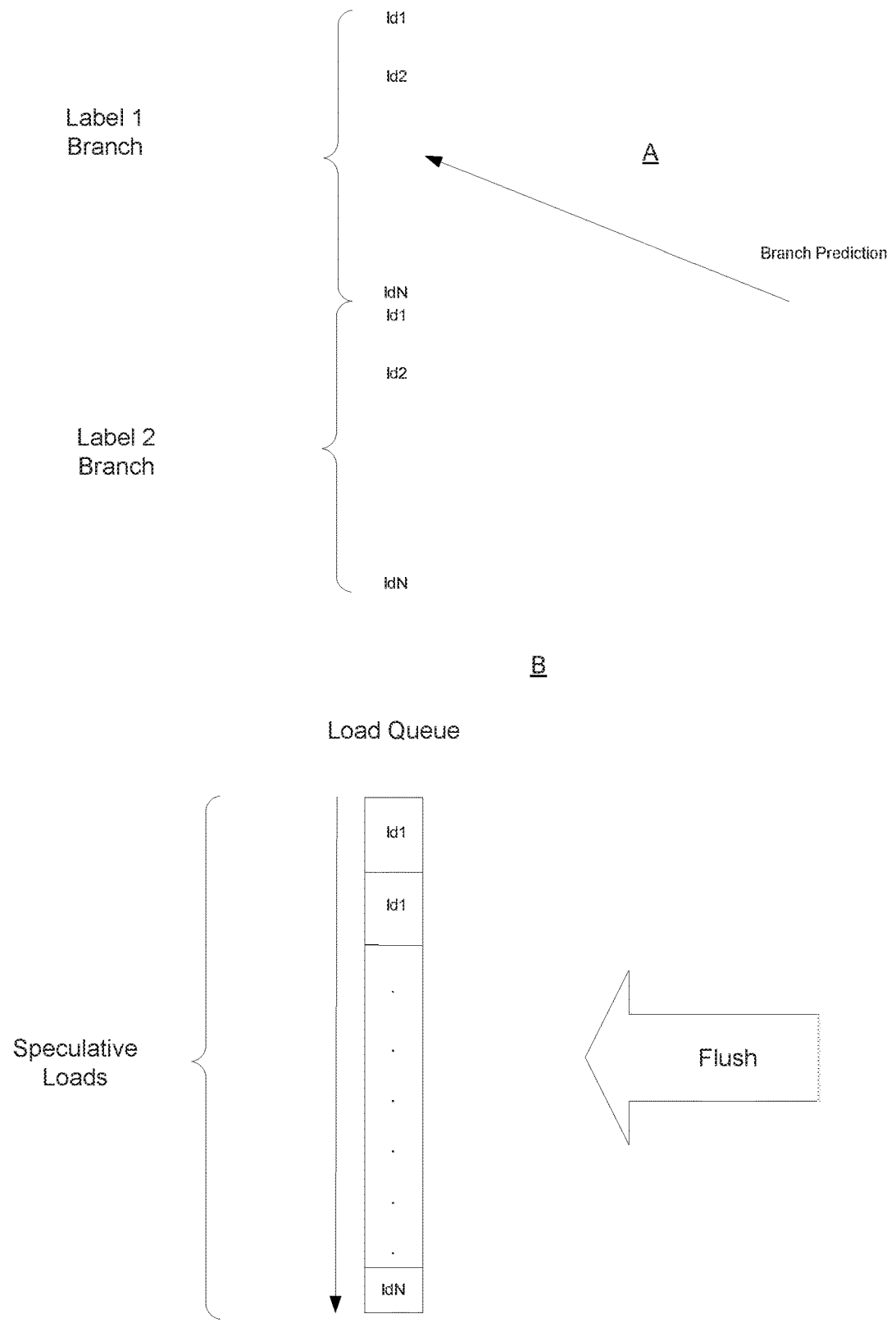
FIG. 1C illustrates operations performed by a system for load canceling in a processor that is connected to an external interconnect fabric according to one embodiment.

FIG. 1C illustrates operations performed by a system for load canceling in a processor that is connected to an external interconnect fabric according to one embodiment. These operations, which relate to efficient pipe flush handling in processors with load speculation are illustrated for purposes of clarity and brevity. It should be appreciated that other operations not illustrated by FIG. 1C can be performed in accordance with one embodiment.

Referring to FIG. 1C, at A, an instruction branch prediction, results in the selection of instruction branch "label 1". In one embodiment, the instruction branch prediction is generated by a branch prediction algorithm. In other embodiments, other manners of making the prediction can be employed. The loads that are associated with instruction branch "label 1" are placed into a load queue (e.g., 103b in FIG. 1B) and are referred to as speculative loads.

At B, it is determined that the branch prediction made in A is erroneous and a load queue flush is signaled. The loads in the load queue are referred to as speculative bad loads.

Figure 1D:
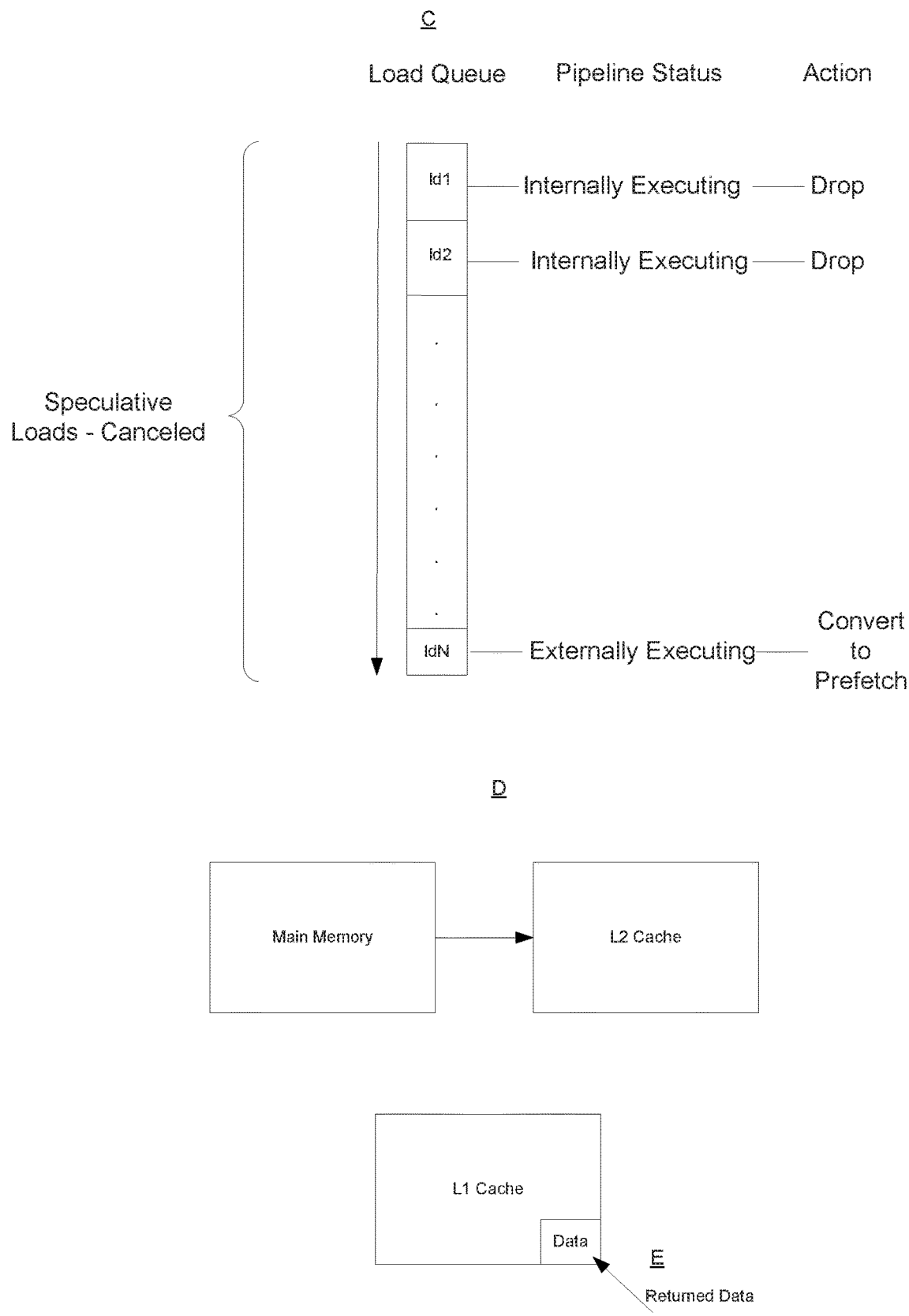
FIG. 1D illustrates operations performed by a system for load canceling in a processor that is connected to an external interconnect fabric according to one embodiment.

At C (see FIG. 1D), all pending speculative bad loads are canceled wherein corresponding load operations that are executing in the instruction pipeline at stages external to the processor are converted from loads to prefetches (which are handled differently than are loads). And, load operations that are executing in the instruction pipeline at stages internal to the processor are dropped (e.g., operations are terminated).

At D (see FIG. 1D), data corresponding to speculative bad loads that were executing in the instruction pipeline at stages external to the processor (e.g., in main memory) at the point in time in which the load queue flush is signaled is returned to the L2 cache (e.g., 107 in FIG. 1A). In one embodiment, because the speculative bad loads that correspond to the returning data have been converted to prefetches, the data is treated as returned prefetch data.

At E (see FIG. 1D), the returned data corresponding to the speculative bad loads is retired in L1 cache. In one embodiment, placing the data in the cache without loading the data into a processor register such as is done in the case of loads is consistent with the handling of prefetch data.

Figure 1E:
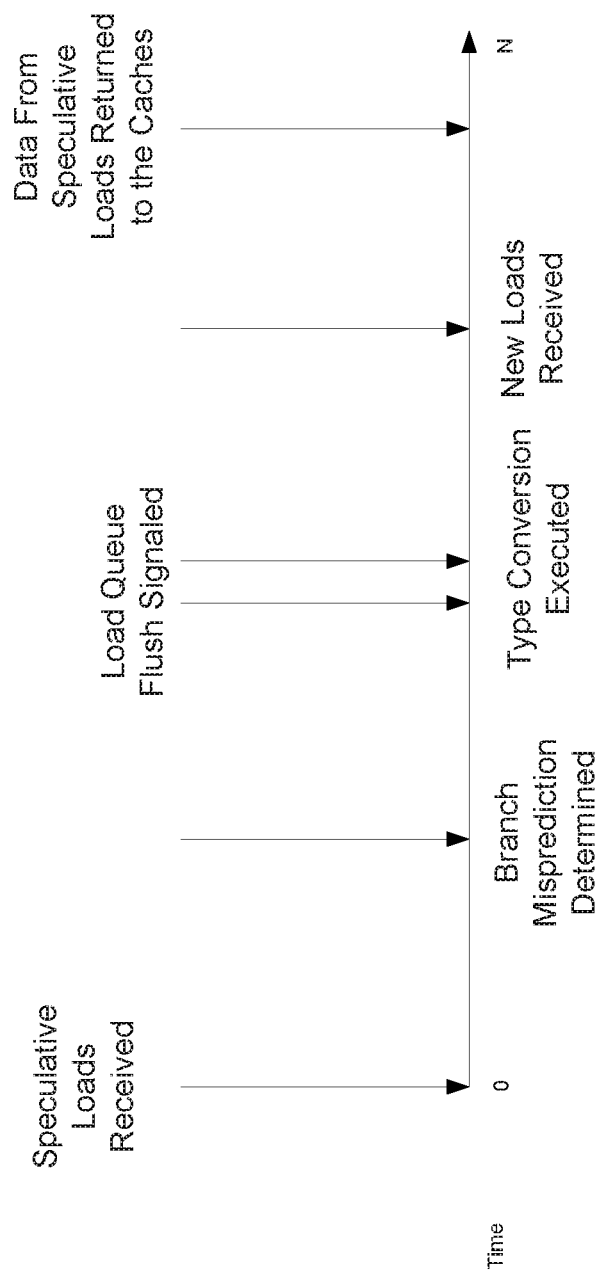
FIG. 1E shows exemplary events in a portion of an instruction pipeline of a system for load canceling in a processor that is connected to an external interconnect fabric according to one embodiment.

FIG. 1E shows exemplary events in a portion of an instruction pipeline of a system for load canceling in a processor that is connected to an external interconnect fabric according to one embodiment. As a part of the pipeline shown in FIG. 1E, and corresponding to times beginning, for example, at time 0 and ending at time N, speculative loads are received, a misprediction is determined, a load queue flush is signaled, a type conversion is executed, new loads are received, and data from speculative bad loads are returned from the interconnect fabric and treated as prefetch data.

Figure 2:
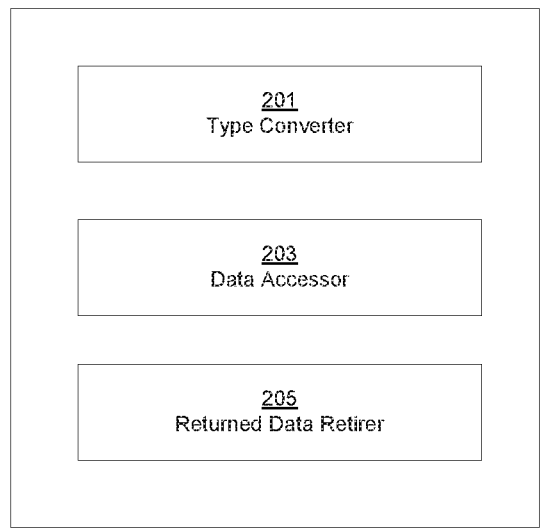
FIG. 2 shows components of a system for load canceling in a processor that is connected to an external bus according to one embodiment.

Components of System for Load Canceling in a Processor that is Connected to an External Interconnect Fabric According to One Embodiment FIG. 2 shows components of a system 101 for load canceling in a processor that is connected to an external interconnect fabric according to one embodiment. In one embodiment, components of system 101 implement an algorithm for load canceling in a cache system that is connected to an external interconnect fabric. In the FIG. 2 embodiment, components of system 101 include type converter 201, data accessor 203 and returned data retirer 205.

Type converter 201 converts one or more pending speculative load operations that are executing in the instruction pipeline at stages external to the processor, from loads to prefetches. In one embodiment, the one or more pending speculative load operations are converted to prefetches responsive to a load queue flush request that prompts the cancellation of pending speculative loads in a load queue associated with a level one cache (e.g., L1 cache 103). In one embodiment, pending speculative load operations, that are executing in the instruction pipeline internal to the processor at the time that the load queue flush request is signaled, are terminated (e.g., dropped).

Data accessor 203 accesses returned data corresponding to one or more speculative loads that are executing in the instruction pipeline at stages external to the processor at the point in time that a flush request is signaled. In one embodiment, the returned data is accessed from sources that are coupled to the cache system by an interconnect fabric. In one embodiment, the interconnect fabric can include but is not limited to an AXI bus.

Returned data retirer 205 places returned data, that corresponds to speculative bad loads that are executing external to the processor when a flush request is signaled, into a cache address.

It should be appreciated that the aforementioned components of system 101 can be implemented in hardware or software or in a combination of both. In one embodiment, components and operations of system 101 can be encompassed by components and operations of one or more computer components or programs (e.g., cache controller 103a in FIG. 1A). In another embodiment, components and operations of system 101 can be separate from the aforementioned one or more computer components or programs but can operate cooperatively with components and operations thereof.

Figure 3:
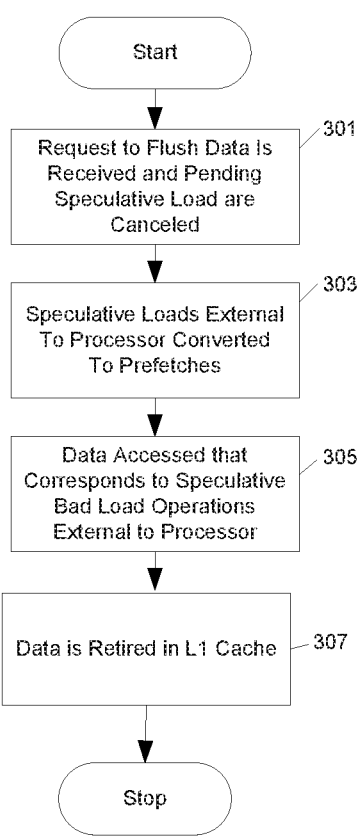
FIG. 3 shows a flowchart of the steps performed in a method for load canceling in a processor that is connected to an external bus according to one embodiment.

Method for Load Canceling in a Processor that is Connected to an External Interconnect Fabric According to One Embodiment FIG. 3 shows a flowchart 300 of the steps performed in a method for load canceling in a processor that is connected to an external interconnect fabric according to one embodiment. The flowchart includes processes that, in one embodiment can be carried out by processors and electrical components under the control of computer-readable and computer-executable instructions. Although specific steps are disclosed in the flowchart, such steps are exemplary. That is the present embodiment is well suited to performing various other steps or variations of the steps recited in the flowchart.

Referring to FIG. 3, at 301, a flush request is received and pending speculative bad loads are canceled from a load queue.

At 303, an action type of one or more pending speculative bad load operations executing in the instruction pipeline at a stage external to the processor is converted, from load to prefetch.

At 305, data is accessed that corresponds to the one or more pending speculative bad load operations executing in the pipeline external to the processor when the load queue flush is received.

At 307, the prefetched data (the data converted to prefetch data) is retired in L1 cache.

With regard to exemplary embodiments thereof, systems and methods for load canceling in a processor that is connected to an external bus are disclosed. As a part of a method for load canceling, and responsive to a flush request and a corresponding cancellation of pending speculative loads from a load queue, a type of one or more of the pending speculative loads that are executing in the instruction pipeline external to the processor, is converted from load to prefetch. Data corresponding to one or more of the pending speculative loads that are executing in the instruction pipeline external to the processor is accessed and returned as prefetch data. The prefetch data is retired in a location of a cache system.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method of handling data returned from a speculative load in a processor that is coupled to an external interconnect fabric, the method comprising:
    receiving data returned for the speculative load after a flush request is processed by an instruction pipeline of the processor, where the speculative load is executing when the flush request is processed;
    storing the data returned for the speculative load as prefetch data in a cache location; and
    dropping a pending speculative load in the instruction pipeline executing at a stage of the instruction pipeline internal to the processor in response to the flush request.

2. A cache controller, comprising:
    a data retiring component to receive data returned for a speculative load in an instruction pipeline of a processor after a flush request is processed by the instruction pipeline, where the speculative load is executing when the flush request is processed, and to store the data returned for the speculative load as prefetch data in a cache location; and
    a converter coupled to the data retiring component, the converter to drop a pending speculative load in the instruction pipeline executing at a stage of the instruction pipeline internal to the processor in response to the flush request.

3. The cache controller of claim 2, wherein the converter is further configured to convert the speculative load to a prefetch in response to the flush request where the speculative load is executing to access data external to the processor.

4. The cache controller of claim 2, wherein the converter is further configured to drop any pending speculative loads that are executing at stages of the instruction pipeline internal to the processor, in response to the flush request.

5. A processor, comprising:
    a set of execution units;
    a load queue; and
    a cache controller, the cache controller including,
    a data retiring component to receive data returned for a speculative load in an instruction pipeline of a processor after a flush request is processed by the instruction pipeline, where the speculative load is executing when the flush request is processed, and to store the data returned for the speculative load as prefetch data in a cache location, and
    a converter to drop a pending speculative load in the instruction pipeline executing at a stage of the instruction pipeline internal to the processor in response to the flush request.

6. The processor of claim 5, wherein the converter is further configured to convert the speculative load to a prefetch in response to the flush request where the speculative load is executing to access data external to the processor.

7. The processor of claim 5, wherein the converter is further configured to drop any pending speculative loads that are executing at stages of the instruction pipeline internal to the processor, in response to the flush request.

* * * * *